CIRCUIT FOR DRIVING A CENTER TAPPED HEAD WINDING
Filed March 1, 1961
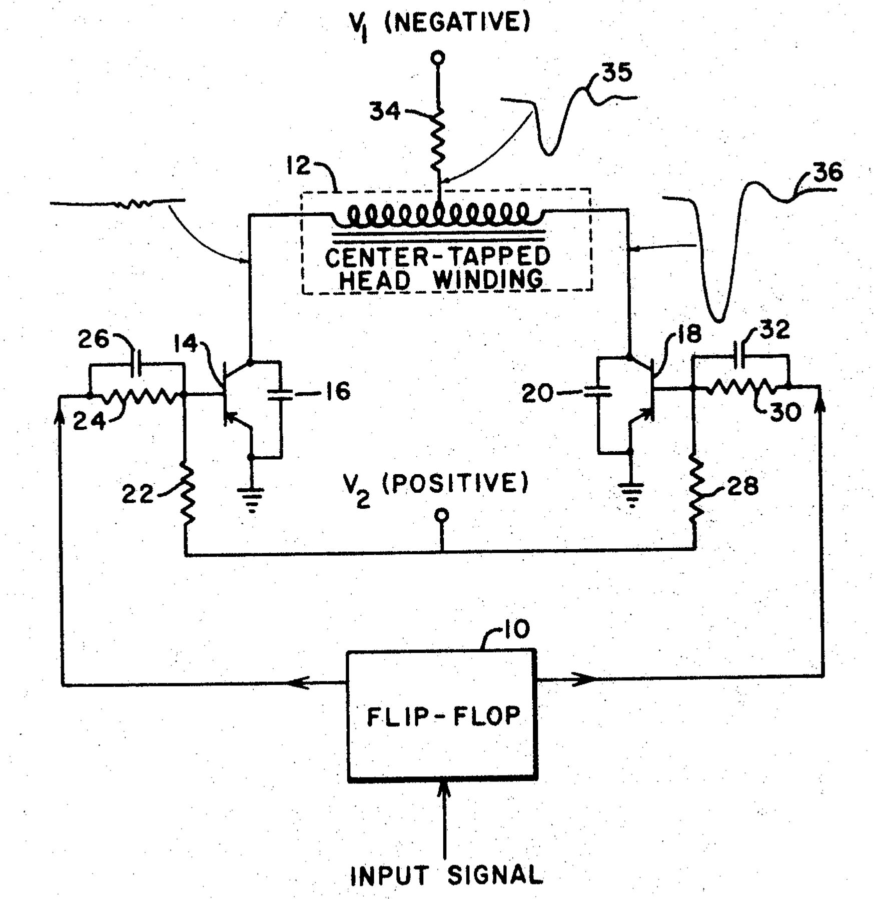
James R. Cox *INVENTOR.*
BY John D. Gassett
ATTORNEY 3,163,804
Patented Dec. 29, 1964

3,163,804

CIRCUIT FOR DRIVING A CENTER TAPPED HEAD WINDING

James R. Cox, Tulsa, Okla., assignor to Jersey Production Research Company, a corporation of Delaware Filed Mar. 1, 1961, Ser. No. 92,557
3 Claims. (Cl. 317—148.5)

This invention relates to a novel system for supplying a driving current to a recording head and especially to a magnetic recording head for use in digital recording on a magnetic recording medium.

In the recording of information on a magnetic recording medium a recording head is used to magnetize the oxide coating of a magnetic tape in one of two opposite directions. Thus as the recording medium is moved with respect to the recording head, different portions of the recording medium are magnetized in different directions by changing the direction of the flow of current in the recording head. When the number of changes per millisecond is relatively small and the recording medium has no previously recorded information thereon, there is no great demand upon the ability of a driving circuit to change the direction of current flow in the recording head in extremely short times. However, when recording on a medium having unwanted information thereon or when it is desired to record high speed digital data such as in the recording of geophysical information, it becomes necessary to have a recording head which is able to obtain rapid changes from positive to negative recording without having a change of voltage large enough to damage the circuit. This invention discloses such a circuit which permits extremely fast switching alternating between positive and negative recording.

It is thus an object of this invention to provide a fast acting amplifier circuit for use in recording digital information on a magnetic recording medium.

Briefly this invention covers a circuit for driving a center tapped head winding which uses a first switching transistor in a circuit between one end of the winding and the ground. A second switching transistor is provided on the circuit from the other end of the winding and the ground. A current limiting resistor is provided in the circuit between a negative supply voltage and the center tap on the winding. When one of the switching transistors is on and the other off, current flows through the limiting resistor, one side of the head winding, and the "on" transistor. Current will flow through the other side of the head winding if the on and off conditions of the transistors are reversed.

Other objects and a better understanding of this invention can be had from the followin description taken in conjunction with the drawing which shows a circuit of the invention which is the best mode contemplated for carrying out the invention.

Turning now to the drawing, there is illustrated a novel digital record amplifier circuit. This circuit is especially useful in the digital recording system. The input signal which can be a signal from an analog-to-digital converter is fed to flip-flop (bistable multivibrator) circuit 10. Also shown is a center tapped head winding 12 used for magnetizing the tape on a digital tape recorder not shown. For each input signal to flip-flop 10 it is desired to reverse the flux in the head winding 12 to record the information on the magnetic tape. The head is wound in such a manner that current flowing through one-half the winding causes flux in one direction and flow of current through the other half of the winding causes flux in the opposite direction. The circuit shown is symmetrical and for purposes of identification and simplification that part on the left hand side will be referred to as the left side and on the right, the right side. A left switching transistor 14 acts as a switch to ground the left half of head winding 12 when the transistor is turned on and acts to open the ground circuit when the transistor is turned off. As illustrated, the collector of transistor 14 is electrically connected to the end tap of the left half of head winding 12. The emitter side of transistor 14 is electrically connected to ground. Connected across the collector and emitter of transistor 14 is a capacitor 16. The purpose of capacitor 16 will be explained more fully hereinafter.

On the right hand side is a transistor 18 which is similar to transistor 14. This transistor switches to ground the right hand side of head winding 12 upon receiving a signal at its base and when no signal is received, the right hand side of the head winding is not grounded. A capacitor 20 is connected across the collector and emitter of transistor 18. The purpose of capacitor 20 which is similar to capacitor 16 will likewise be explained later.

The driving circuit for the base of transistor 14 includes resistor 22 which is in the circuit between a positive voltage source $V_2$ and the base of the transistor. Between the left side of flip-flop 10 and the base of transistor 14 is resistor 24 and capacitor 26. The part of the circuit including resistors 22 and 24 and capacitor 26 are for use in providing means such that a negative signal will turn a transistor on. The right hand transistor 18 likewise has a similar identical driving circuit which includes resistor 28, resistor 30 and capacitor 32. The left and right output of flip-flop 10 are complements of each other such that when one output is negative, the other is zero or positive with respect to the other. The state of these output reverses with each input signal to the flip-flop circuit.

A negative voltage from voltage source $V_1$ is applied to resistor 34 which is connected to the center tap of head winding 12. Resistor 34 controls the amount of current which flows in head winding 12 inasmuch as head winding 12 has negligible resistance. Whether the current flows through the left half or the right half of head winding 12 depends upon whether transistors 14 or 18 is on.

At the time transistor 18 is turned off there occurs a waveform such as 36 at the collector of the transistor. This negative excursion of voltage is caused by stopping the current in the inductance of the right hand of winding 12. The magnitude of the negative voltage is directly proportional to the rate of change of current in the head winding. If the rate of change of current is not carefully controlled, the voltage will become large enough to damage the transistor. The purpose of capacitor 20 is to control the rate of change of current. When transistor 18 is turned off in a very short period of time, the current does not stop immediately, but decreases gradually while charging capacitor 20. The resulting voltage waveform is that shown as 36. Increasing the size of the capacitor decreases the amplitude of the negative excursion and increases the duration of the transition. It is desirable to make the duration as short as possible while keeping the amplitude within the limit imposed by the transistor voltage limitation. As shown, a slight amount of ringing can be expected at the trailing edge of the wave. If the ringing is excessive, it is dampened by adding a resistor across capacitor 20.

The description in the above paragraph applies to the left hand side of the circuit during the next transition.

In the usual method of driving a recording head the negative voltage supply is applied directly to the center tap of a head winding. The current limiting resistors are between the end taps of the head winding and the accompanying switching transistors. The resistors can be by-passed by capacitors to speed up the switching operations. The system disclosed in this invention has operational advantages over that system in use heretofore. For example, the system of this invention has faster switching for the same peak voltages in each system. To reverse a given amount of flux such as in the head winding requires a certain volt-second area to be applied to the coil. For a faster speed with a given peak voltage the applied voltage signal should be a square pulse. It has been shown by experiments that the voltages in this disclosed system more nearly approaches the square wave pulse (as illustrated at 35 and 36) than do the pulses of the prior system. In both the herein disclosed system and the prior system the peak voltage across the transistor is determined by how fast the current is switched. In the prior system this required a carefuly controlled switching of the transistor to limit the peak voltage across the transistor. In this system the switching time is controlled by capacitors 16 and 20 and the inductance of the head winding. Then in the present system the transistors can switch fast and the actual rate of change of current in the head winding and therefore the peak voltage across the transistor is determined solely by the passive elements comprising capacitors 16 and 20 and the head winding.

Other advantages of the present circuit of this invention are that a somewhat non-symmetrical drive signal can be tolerated as long as the transistor that has been off is turned on before the other transistor is turned off. Since there is essentially no voltage at the center tap of the head winding until the "on" transistor is turned off, no change will occur when the "off" transistor is turned on. Further, a failure in any part of the circuit will not cause excessive current in the head unless it shorts the current limiting resistor. In the steady state condition there is very little voltage across either transistor, thus very little power is lost in leakage.

It is possible to produce other embodiments without departing from the inventive concept herein disclosed. It is therefore desired that only such limitations be imposed on the appended claims as are stated therein.

What is claimed is:

1. A circuit for driving a center tapped head winding which comprises in combination: a first switching transistor having a collector, an emitter and a base; a first relatively resistant-free conductor connecting the collector of said first switching transistor to one end of said head winding; a second switching transistor having an emitter, a collector and a base; a second relatively resistant-free conductor connecting the collector of said second switching transistor to the other end of said head winding; a third relatively resistant-free circuit connecting the emitter and collector of the first switching transistor; a capacitor in said third relative resistant-free circuit; a fourth relatively resistant-free circuit connecting the emitter and collector of said second switching transistor; a second capacitor in the fourth relatively resistant-free circuit; means grounding the emitter of each switching transistor; a negative voltage source; a current limiting resistor in the circuit between the negative voltage supply and the center tap of said head winding; a positive voltage source; a fifth circuit including a resistor connecting said positive voltage source to the base of said first switching transistor; a sixth circuit, including a resistor connecting said positive voltage source to the base of said second switching transistor; a flip-flop means having a first output and a second output; a seventh circuit including a resistor connecting the first output of said flip-flop means to the base of said first switching transistor; a capacitor connected across the resistor in said seventh circuit; an eighth circuit including a resistor connecting the second output of said flip-flop means with the base of said second switching transistor and a capacitor connected across the resistor in said eighth circuit.

2. A circuit for driving a center tapped head winding which comprises in combination:

- a first switching transistor having a base, a collector, and an emitter;
- a second switching transistor having a base, a collector, and an emitter;
- a first relatively resistant-free conductor connecting the collector of said first switching transistor to one end of said head winding;
- a second relatively resistant-free conductor connecting the collector of said second switching transistor to the other end of said head winding;
- a flip-flop means having a first output and a second output;
- a negative voltage source;
- means, including a limiting resistor, connecting the center tap of said head winding to said negative voltage source;
- a positive voltage source;
- a first circuit means, having a resistor therein, and connecting said positive voltage source to the base of said first switching transistor;
- a second circuit means, having a second resistor therein, and connecting said positive voltage source to the base of said second switching transistor;
- a third circuit means connecting the first output of said flip-flop with the base of said first switching transistor;
- means providing impedance for said third circuit means;
- fourth circuit means connecting the second output of said flip-flop means with the base of said second switching transistor; and
- means providing impedance for said fourth circuit means.

3. A circuit for driving a center tapped head winding which comprises in combination:

- a first switching transistor having a base, a collector, and an emitter;
- a second switching transistor having a base, a collector and an emitter;
- a first relatively resistant-free conductor connecting the collector of said first switching transistor to one end of said head winding;
- a second relatively resistant-free conductor connecting the collector of said second switching transistor to the other end of said head winding;
- a flip-flop means having a first output terminal and a second output terminal, said flip-flop having at all times an output signal on one, and only one, of said terminals;
- a negative voltage source;
- means, including a limiting resistor, connecting the center tap of said head winding to said negative voltage source;
- a positive voltage source;
- a first circuit means, including a first resistor therein, and connecting said positive voltage source to the base of said first switching transistor;
- a second circuit means, including a second resistor therein, and connecting said positive voltage source to the base of said second switching transistor;
- a third circuit means including a resistor connecting the first output terminal of said flip-flop means to the base of said first switching transistor;
- a capacitor connected across the resistor in said third circuit means;
- a fourth circuit means including a resistor connecting the second output terminal of said flip-flop means to the base of said second switching transistor; and a capacitor connected across the resistor in said fourth circuit means.

References Cited in the file of this patent

UNITED STATES PATENTS

| | | |
|---|---|---|
| 2,838,675 | Wanlass | June 10, 1958 |
| 2,853,357 | Barber | Sept. 23, 1958 |
| 2,900,215 | Schoen | Aug. 18, 1959 |
| 3,005,955 | Grant | Oct. 24, 1961 |
| 3,049,650 | Greenblatt | Aug. 14, 1962 |
| 3,059,126 | Hansson | Oct. 16, 1962 |

FOREIGN PATENTS

| | | |
|---|---|---|
| 788,949 | Great Britain | Jan. 8, 1958 |